(12) United States Patent
Kish

(10) Patent No.: US 8,670,725 B2
(45) Date of Patent: Mar. 11, 2014

(54) CLOSED-LOOP AUTOMATIC CHANNEL SELECTION

(75) Inventor: William S. Kish, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 1121 days.

(21) Appl. No.: 11/841,619

(22) Filed: Aug. 20, 2007

(65) Prior Publication Data

US 2008/0070509 A1   Mar. 20, 2008

Related U.S. Application Data

(60) Provisional application No. 60/822,917, filed on Aug. 18, 2006.

(51) Int. Cl.
*H04B 1/00* (2006.01)
*H04B 7/00* (2006.01)

(52) U.S. Cl.
USPC ........ 455/69; 455/67.11; 455/452.2; 455/509

(58) Field of Classification Search
USPC ........... 455/450, 451, 452.1, 452.2, 453, 455, 455/464, 8, 9, 509, 510, 511, 512, 513, 514, 455/516, 67.11, 67.13, 67.14, 69
See application file for complete search history.

(56) References Cited

U.S. PATENT DOCUMENTS

| | | | |
|---|---|---|---|
| 4,027,307 A | 5/1977 | Litchford | |
| 4,176,356 A | 11/1979 | Foster et al. | |
| 4,193,077 A | 3/1980 | Greenberg et al. | |
| 4,253,193 A | 2/1981 | Kennard | |
| 4,305,052 A | 12/1981 | Baril et al. | |
| 4,513,412 A | 4/1985 | Cox | |
| 4,641,304 A | 2/1987 | Raychaudhuri | |
| 4,814,777 A | 3/1989 | Monser | |
| 5,097,484 A | 3/1992 | Akaiwa | |
| 5,173,711 A | 12/1992 | Takeuchi et al. | |
| 5,203,010 A | 4/1993 | Felix | |
| 5,220,340 A | 6/1993 | Shafai | |
| 5,373,548 A | 12/1994 | McCarthy | |
| 5,408,465 A | 4/1995 | Gusella et al. | |

(Continued)

FOREIGN PATENT DOCUMENTS

| | | |
|---|---|---|
| EP | 0352787 | 7/1989 |
| EP | 0 534 612 | 3/1993 |

(Continued)

OTHER PUBLICATIONS

Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.

(Continued)

*Primary Examiner* — Ping Hsieh
(74) *Attorney, Agent, or Firm* — Lewis Roca Rothgerber LLP

(57) ABSTRACT

A system and method for improving radio performance through automatic channel selection utilizing a closed-channel model is disclosed. A measurement engine records maximum user throughput on a per station basis during normal traffic operation. The measurement engine further records throughput metrics based on test traffic sent to all associated stations during idle operation. A policy logic engine utilizes the measurements to determine an optimal transmission channel for transmission and receipt of data.

19 Claims, 5 Drawing Sheets

(56) References Cited

U.S. PATENT DOCUMENTS

| | | |
|---|---|---|
| 5,453,752 A | 9/1995 | Wang et al. |
| 5,507,035 A | 4/1996 | Bantz |
| 5,559,800 A | 9/1996 | Mousseau et al. |
| 5,697,066 A | 12/1997 | Acampora |
| 5,754,145 A | 5/1998 | Evans |
| 5,767,809 A | 6/1998 | Chuang et al. |
| 5,802,312 A | 9/1998 | Lazaridis et al. |
| 5,940,771 A | 8/1999 | Gollnick et al. |
| 5,964,830 A | 10/1999 | Durrett |
| 6,005,525 A | 12/1999 | Kivela |
| 6,034,638 A | 3/2000 | Thiel et al. |
| 6,094,177 A | 7/2000 | Yamamoto |
| 6,169,888 B1 | 1/2001 | Lindenmeier et al. |
| 6,249,216 B1 | 6/2001 | Flick |
| 6,266,528 B1 | 7/2001 | Farzaneh |
| 6,266,537 B1 | 7/2001 | Kashitani et al. |
| 6,288,682 B1 | 9/2001 | Thiel et al. |
| 6,292,153 B1 | 9/2001 | Aiello et al. |
| 6,307,524 B1 | 10/2001 | Britain |
| 6,317,599 B1 | 11/2001 | Rappaport et al. |
| 6,326,922 B1 | 12/2001 | Hegendoerfer |
| 6,337,628 B2 | 1/2002 | Campana, Jr. |
| 6,337,668 B1 | 1/2002 | Ito et al. |
| 6,339,404 B1 | 1/2002 | Johnson et al. |
| 6,345,043 B1 | 2/2002 | Hsu |
| 6,356,242 B1 | 3/2002 | Ploussios |
| 6,356,243 B1 | 3/2002 | Schneider et al. |
| 6,356,905 B1 | 3/2002 | Gershman et al. |
| 6,377,227 B1 | 4/2002 | Zhu et al. |
| 6,392,610 B1 | 5/2002 | Braun et al. |
| 6,404,386 B1 | 6/2002 | Proctor, Jr. et al. |
| 6,407,719 B1 | 6/2002 | Ohira et al. |
| 6,442,507 B1 | 8/2002 | Skidmore et al. |
| 6,445,688 B1 | 9/2002 | Garces et al. |
| 6,492,957 B2 | 12/2002 | Carillo, Jr. et al. |
| 6,493,679 B1 | 12/2002 | Rappaport et al. |
| 6,496,504 B1 | 12/2002 | Malik |
| 6,498,589 B1 | 12/2002 | Horii |
| 6,499,006 B1 | 12/2002 | Rappaport et al. |
| 6,507,321 B2 | 1/2003 | Oberschmidt et al. |
| 6,606,059 B1 | 8/2003 | Barabash |
| 6,625,454 B1 | 9/2003 | Rappaport et al. |
| 6,674,459 B2 | 1/2004 | Ben-Shachar et al. |
| 6,701,522 B1 | 3/2004 | Rubin et al. |
| 6,725,281 B1 | 4/2004 | Zintel et al. |
| 6,753,814 B2 | 6/2004 | Killen et al. |
| 6,762,723 B2 | 7/2004 | Nallo et al. |
| 6,779,004 B1 | 8/2004 | Zintel |
| 6,819,287 B2 | 11/2004 | Sullivan et al. |
| 6,876,280 B2 | 4/2005 | Nakano |
| 6,888,504 B2 | 5/2005 | Chiang et al. |
| 6,888,893 B2 | 5/2005 | Li et al. |
| 6,892,230 B1 | 5/2005 | Gu et al. |
| 6,906,678 B2 | 6/2005 | Chen |
| 6,910,068 B2 | 6/2005 | Zintel et al. |
| 6,924,768 B2 | 8/2005 | Wu et al. |
| 6,931,429 B2 | 8/2005 | Gouge et al. |
| 6,941,143 B2 | 9/2005 | Mathur |
| 6,950,019 B2 | 9/2005 | Bellone et al. |
| 6,961,028 B2 | 11/2005 | Joy et al. |
| 6,961,573 B1 * | 11/2005 | Moon et al. .................. 455/445 |
| 6,973,622 B1 | 12/2005 | Rappaport et al. |
| 6,975,834 B1 | 12/2005 | Forster |
| 7,034,770 B2 | 4/2006 | Yang et al. |
| 7,043,277 B1 | 5/2006 | Pfister |
| 7,050,809 B2 | 5/2006 | Lim |
| 7,064,717 B2 | 6/2006 | Kaluzni et al. |
| 7,085,814 B1 | 8/2006 | Gandhi et al. |
| 7,089,307 B2 | 8/2006 | Zintel et al. |
| 7,130,895 B2 | 10/2006 | Zintel et al. |
| 7,164,380 B2 | 1/2007 | Saito |
| 7,171,475 B2 | 1/2007 | Weisman et al. |
| 7,190,972 B1 | 3/2007 | Hollister et al. |
| 7,206,610 B2 | 4/2007 | Iacono et al. |
| 7,254,373 B2 | 8/2007 | Paljug et al. |
| 7,333,460 B2 | 2/2008 | Väisänen et al. |
| 7,355,998 B2 | 4/2008 | Briancon |
| 7,385,962 B1 | 6/2008 | Valo |
| 7,596,388 B2 | 9/2009 | Willins et al. |
| 7,609,648 B2 | 10/2009 | Hoffmann et al. |
| 7,649,831 B2 | 1/2010 | Van Rensburg et al. |
| 7,724,658 B2 | 5/2010 | Eiriksson et al. |
| 7,773,557 B2 | 8/2010 | Grant et al. |
| 7,782,895 B2 * | 8/2010 | Pasanen et al. ............... 370/465 |
| 7,835,697 B2 * | 11/2010 | Wright ............................ 455/62 |
| 7,877,113 B2 | 1/2011 | Kish et al. |
| 7,899,497 B2 | 3/2011 | Kish et al. |
| 7,933,628 B2 | 4/2011 | Kish et al. |
| 8,150,470 B2 | 4/2012 | Kish et al. |
| 8,217,843 B2 | 7/2012 | Shtrom et al. |
| 2001/0012764 A1 | 8/2001 | Edwards et al. |
| 2002/0031130 A1 | 3/2002 | Tsuchiya et al. |
| 2002/0047800 A1 | 4/2002 | Proctor, Jr. et al. |
| 2002/0080767 A1 | 6/2002 | Lee |
| 2002/0084942 A1 | 7/2002 | Tsai et al. |
| 2002/0105471 A1 | 8/2002 | Kojima et al. |
| 2002/0112058 A1 | 8/2002 | Weisman et al. |
| 2002/0119757 A1 * | 8/2002 | Hamabe ........................ 455/69 |
| 2002/0142744 A1 | 10/2002 | Okanoue et al. |
| 2002/0158798 A1 | 10/2002 | Chiang et al. |
| 2002/0158801 A1 | 10/2002 | Crilly, Jr. et al. |
| 2002/0170064 A1 | 11/2002 | Monroe et al. |
| 2003/0026240 A1 | 2/2003 | Eyuboglu et al. |
| 2003/0030588 A1 | 2/2003 | Kalis et al. |
| 2003/0038698 A1 | 2/2003 | Hirayama |
| 2003/0063591 A1 | 4/2003 | Leung et al. |
| 2003/0122714 A1 | 7/2003 | Wannagot et al. |
| 2003/0162551 A1 | 8/2003 | Atarashi et al. |
| 2003/0169330 A1 | 9/2003 | Ben-Shachar et al. |
| 2003/0172114 A1 | 9/2003 | Leung |
| 2003/0184490 A1 | 10/2003 | Raiman et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0227414 A1 | 12/2003 | Saliga et al. |
| 2003/0228857 A1 | 12/2003 | Maeki |
| 2004/0008614 A1 | 1/2004 | Matsuoka et al. |
| 2004/0014432 A1 | 1/2004 | Boyle |
| 2004/0017310 A1 | 1/2004 | Runkle et al. |
| 2004/0017860 A1 | 1/2004 | Liu |
| 2004/0027291 A1 | 2/2004 | Zhang et al. |
| 2004/0027304 A1 | 2/2004 | Chiang et al. |
| 2004/0032378 A1 | 2/2004 | Volman et al. |
| 2004/0036651 A1 | 2/2004 | Toda |
| 2004/0036654 A1 | 2/2004 | Hsieh |
| 2004/0041732 A1 | 3/2004 | Aikawa et al. |
| 2004/0047296 A1 | 3/2004 | Tzannes et al. |
| 2004/0048593 A1 | 3/2004 | Sano |
| 2004/0058690 A1 | 3/2004 | Ratzel et al. |
| 2004/0061653 A1 | 4/2004 | Webb et al. |
| 2004/0070543 A1 | 4/2004 | Masaki |
| 2004/0080455 A1 | 4/2004 | Lee |
| 2004/0082356 A1 | 4/2004 | Walton et al. |
| 2004/0095278 A1 | 5/2004 | Kanemoto et al. |
| 2004/0114535 A1 | 6/2004 | Hoffmann et al. |
| 2004/0125777 A1 | 7/2004 | Doyle et al. |
| 2004/0132496 A1 | 7/2004 | Kim et al. |
| 2004/0162115 A1 | 8/2004 | Smith et al. |
| 2004/0165563 A1 | 8/2004 | Hsu et al. |
| 2004/0190477 A1 | 9/2004 | Olson et al. |
| 2004/0260800 A1 | 12/2004 | Gu et al. |
| 2005/0022210 A1 | 1/2005 | Zintel et al. |
| 2005/0032531 A1 | 2/2005 | Gong et al. |
| 2005/0041739 A1 | 2/2005 | Li et al. |
| 2005/0042988 A1 | 2/2005 | Hoek et al. |
| 2005/0053164 A1 | 3/2005 | Catreux |
| 2005/0074018 A1 | 4/2005 | Zintel et al. |
| 2005/0074108 A1 | 4/2005 | Dezonno et al. |
| 2005/0083852 A1 | 4/2005 | Alastalo et al. |
| 2005/0097503 A1 | 5/2005 | Zintel et al. |
| 2005/0128988 A1 | 6/2005 | Simpson |
| 2005/0135480 A1 | 6/2005 | Li et al. |
| 2005/0138137 A1 | 6/2005 | Encarnacion et al. |

(56) References Cited

U.S. PATENT DOCUMENTS

| | | |
|---|---|---|
| 2005/0138193 A1 | 6/2005 | Encarnacion et al. |
| 2005/0148306 A1 | 7/2005 | Hiddink |
| 2005/0153658 A1 | 7/2005 | Nagy |
| 2005/0180381 A1 | 8/2005 | Retzer et al. |
| 2005/0185707 A1 | 8/2005 | Hoo et al. |
| 2005/0188193 A1 | 8/2005 | Kuehnel et al. |
| 2005/0240665 A1 | 10/2005 | Gu et al. |
| 2005/0250544 A1 | 11/2005 | Grant et al. |
| 2005/0255892 A1 | 11/2005 | Wong et al. |
| 2005/0267935 A1 | 12/2005 | Gandhi et al. |
| 2006/0094371 A1 | 5/2006 | Nguyen |
| 2006/0098607 A1 | 5/2006 | Zeng et al. |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0125601 A1 | 6/2006 | Onishi |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0199544 A1* | 9/2006 | Ramakrishna et al. .... 455/67.11 |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0258304 A1 | 11/2006 | Moon et al. |
| 2006/0291434 A1 | 12/2006 | Gu et al. |
| 2007/0010271 A1 | 1/2007 | Roy |
| 2007/0026807 A1 | 2/2007 | Kish et al. |
| 2007/0027622 A1 | 2/2007 | Cleron et al. |
| 2007/0049208 A1* | 3/2007 | Kim et al. ........................ 455/69 |
| 2007/0053295 A1 | 3/2007 | Cleveland et al. |
| 2007/0066320 A1 | 3/2007 | Padovani et al. |
| 2007/0115180 A1 | 5/2007 | Kish et al. |
| 2007/0135167 A1 | 6/2007 | Liu |
| 2007/0153916 A1* | 7/2007 | Demircin et al. ........ 375/240.26 |
| 2007/0191068 A1 | 8/2007 | Ochi et al. |
| 2008/0013638 A1 | 1/2008 | Walton et al. |
| 2008/0080631 A1 | 4/2008 | Forenza et al. |
| 2008/0212582 A1 | 9/2008 | Zwart et al. |
| 2009/0046802 A1 | 2/2009 | Subramaniam |
| 2009/0080333 A1 | 3/2009 | Ozer et al. |
| 2009/0154359 A1 | 6/2009 | Strutt et al. |
| 2009/0285331 A1 | 11/2009 | Sugar et al. |
| 2009/0310590 A1 | 12/2009 | Kish et al. |
| 2010/0008343 A1 | 1/2010 | Kish et al. |
| 2010/0027496 A1 | 2/2010 | Higuchi et al. |
| 2010/0045480 A1 | 2/2010 | Vallapureddy et al. |
| 2010/0091749 A1 | 4/2010 | Kish et al. |
| 2010/0231473 A1 | 9/2010 | Shtrom et al. |
| 2011/0306293 A1 | 12/2011 | Miller |
| 2012/0039259 A1 | 2/2012 | Kish et al. |
| 2012/0094705 A1 | 4/2012 | Kish et al. |

FOREIGN PATENT DOCUMENTS

| | | |
|---|---|---|
| EP | 1 315 311 | 5/2003 |
| EP | 1 450 521 | 8/2004 |
| EP | 1 608 108 | 12/2005 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| WO | WO 02/25967 | 3/2002 |
| WO | WO 03/079484 | 9/2003 |

OTHER PUBLICATIONS

Tsunekawa, Kouichi "Diversity Antennas for Portable Telephones," 39th IEEE Vehicular Technology, May 1-3, 1989, San Francisco, CA.

Decision on Request for Rehearing from Board of Patent Appeal and Interferences mailed Sep. 28, 2011 in Reexamination U.S. Appl. No. 95/001,078.

Examiner's Answer to Appeal Brief mailed Sep. 2, 2011 in U.S. Appl. No. 11/413,293.

PCT/US2005/026933, Search Report and Written Opinion mailed Feb. 22, 2006.

PCT/US2006/026418, Search Report and Written Opinion mailed Jan. 17, 2008.

U.S. Appl. No. 11/180,329, Office Action mailed Jun. 22, 2010.

U.S. Appl. No. 11/180,329, Office Action mailed Apr. 22, 2009.

U.S. Appl. No. 11/180,329, Office Action mailed Nov. 28, 2007.

U.S. Appl. No. 12/283,223, Final Office Action mailed Aug. 4, 2010.

U.S. Appl. No. 12/545,796, Office Action mailed Feb. 28, 2012.

U.S. Appl. No. 12/575,422, Final Office Action mailed Mar. 23, 2012.

U.S. Appl. No. 13/282,157, Final Office Action mailed Aug. 2, 2012.

U.S. Appl. No. 13/282,157, Office Action mailed Apr. 11, 2012.

U.S. Appl. No. 11/474,057, Office Action mailed Jul. 21, 2010.

U.S. Appl. No. 13/340,425, Office Action mailed Feb. 25, 2013.

Chu, S.H. et al., "Performance Enhancement by Using Switch-Beam Smart Antenna in 802.11a WLAN System," IEEE/ACES International Conference on Wireless Communications and Applied Computational Electromagnetics, pp. 1101-1105, Apr. 3-7, 2005.

Office Action mailed Aug. 2, 2013 (best available copy, no English translation provided).

U.S. Appl. No. 12/545,796, Office Action mailed Jun. 28, 2013.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Vincent D. Park, et al., "A Performance Comparison of the Temporally-Ordered Routing Algorithm and Ideal Link-State Routing," IEEE, Jul. 1998, pp. 592-598.

Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology, Jul. 1, 2001.

Dell Inc., "How Much Broadcast and Multicast Traffic Should I Allow in My Network," PowerConnect Application Note #5, Nov. 2003.

Toskala, Antti, "Enhancement of Broadcast and Introduction of Multicast Capabilities in RAN," Nokia Networks, Palm Springs, California, Mar. 13-16, 2001.

Microsoft Corporation, "IEEE 802.11 Networks and Windows XP," Windows Hardware Developer Central, Dec. 4, 2001.

Festag, Andreas, "What is MOMBASA?" Telecommunication Networks Group (TKN), Technical University of Berlin, Mar. 7, 2002.

Hewlett Packard, "HP ProCurve Networking: Enterprise Wireless LAN Networking and Mobility Solutions," 2003.

Dutta, Ashutosh et al., "MarconiNet Supporting Streaming Media Over Localized Wireless Multicast," Proc. of the 2d Int'l Workshop on Mobile Commerce, 2002.

Dunkels, Adam et al., "Making TCP/IP Viable for Wireless Sensor Networks," Proc. of the 1st Euro. Workshop on Wireless Sensor Networks, Berlin, Jan. 2004.

Dunkels, Adam et al., "Connecting Wireless Sensornets with TCP/IP Networks," Proc. of the 2d Int'l Conf. on Wired Networks, Frankfurt, Feb. 2004.

Cisco Systems, "Cisco Aironet Access Point Software Configuration Guide: Configuring Filters and Quality of Service," Aug. 2003.

Hirayama, Koji et al., "Next-Generation Mobile-Access IP Network," Hitachi Review vol. 49, No. 4, 2000.

Pat Calhoun et al., "802.11r strengthens wireless voice," Technology Update, Network World, Aug. 22, 2005, http://www.networkworld.com/news/tech/2005/082208techupdate.html.

Areg Alimian et al., "Analysis of Roaming Techniques," doc.:IEEE 802.11-04/0377r1, Submission, Mar. 2004.

Information Society Technologies Ultrawaves, "System Concept / Architecture Design and Communication Stack Requirement Document," Feb. 23, 2004.

Golmie, Nada, "Coexistence in Wireless Networks: Challenges and System-Level Solutions in the Unlicensed Bands," Cambridge University Press, 2006.

(56) References Cited

OTHER PUBLICATIONS

Mawa, Rakesh, "Power Control in 3G Systems," Hughes Systique Corporation, Jun. 28, 2006.

Wennstrom, Mattias et al., "Transmit Antenna Diversity in Ricean Fading MIMO Channels with Co-Channel Interference," 2001.

Steger, Christopher et al., "Performance of IEEE 802.11b Wireless LAN in an Emulated Mobile Channel," 2003.

Chang, Nicholas B. et al., "Optimal Channel Probing and Transmission Scheduling for Opportunistics Spectrum Access," Sep. 2007.

* cited by examiner

CLOSED-LOOP AUTOMATIC CHANNEL SELECTION

CROSS-REFERENCE TO RELATED APPLICATIONS

The present application claims the priority benefit of U.S. provisional patent application No. 60/822,917 filed Aug. 18, 2006 and entitled "Closed-Loop Channel Selection," the disclosure of which is incorporated herein by reference.

The present application is related to U.S. patent application Ser. No. 11/180,329 entitled "Transmission and Reception Parameter Control for an Antenna Apparatus with Selectable Elements"; U.S. patent application Ser. No. 11/010,076 entitled "System and Method for an Omnidirectional Planar Antenna Apparatus with Selectable Elements"; U.S. patent application Ser. No. 11/041,145 entitled "System and Method for a Minimized Antenna Apparatus with Selectable Elements"; and U.S. Pat. No. 7,193,562 for a "Circuit Board Having a Peripheral Antenna Apparatus with Selectable Antenna Elements." The disclosure of the aforementioned applications and patent are incorporated herein by reference.

BACKGROUND OF THE INVENTION

1. Field of the Invention

The present invention relates to wireless communication networks, specifically to reducing interference in a wireless communication network through channel selection.

2. Description of the Related Art

In communications systems, there is an ever-increasing demand for higher data throughput. There is a corresponding drive to reduce interference that can disrupt such communications systems.

The Institute of Electrical & Electronic Engineers (IEEE) 802.11b and 802.11g wireless local area network (WLAN) specifications divide the 2.4 gigahertz (GHz) spectrum into 14 overlapping, staggered channels. The center frequency for each of these channels is five megahertz (MHz) apart. The 802.11b and 802.11g standards further specify a spectral mask width to power level for each channel. For example, the spectral mask for 802.11b requires that the signal be attenuated by at least 30 dB from its peak energy at +11 MHz from the center frequency. As a result, an 802.11b compliant transceiver occupies five channels to an energy level of 30 dB down from the peak or center of the signal. In the United States—per Federal Communications Commission (FCC) mandate—the valid channels are one through eleven meaning that the number of non-overlapped channels is limited to channels 1, 6, and 11.

In an 802.11 compliant wireless communication network, an access point such as a base station acts as a bridge between a WLAN and a wired local area network (LAN). The access point communicates data with one or more remote receiving nodes over a wireless link in the WLAN. Due to the limited number of non-overlapped channels, the wireless link may be susceptible to interference from other access points and radio transmitting devices. The interference may force communication at a lower data rate or completely disrupt the wireless link all together.

Further, the radio spectrum is subject to arbitrary interference, which may vary from channel-to-channel. For example, the 802.11b and 802.11g standards both utilize the aforementioned 2.4 GHz band. As a result, interference may be generated from the likes of microwave ovens, cordless telephones, and Bluetooth devices. Certain components in a radio communication system (e.g., a digital subsystem) may also produce local noise. This arbitrary interference may pose a problem in that many radio communication system components have frequency-dependent performance characteristics.

To address the issue of interference in a WLAN, many access points include automatic channel selection capabilities. Automatic channel selection involves an access point attempting to identify a channel free or substantially free from interference from amongst available wireless channels. The access points then 'jumps' from channel-to-channel to avoid interfering conditions. In a wireless environment with a number of access points (e.g., a mesh network), an access point senses the presence of other access points and attempts to adjust to a quieter channel when interference from the other access points is detected.

Most automatic channel selection algorithms operate on an open-loop model. In an open-loop model, interference is evaluated only at the victimized access point while interactions between the interfering access point and the victimized receiver are ignored. Open-loop evaluation generally consists of a 'receive only' mathematical analysis technique based on a probability of packet collision in time and frequency. Open-loop selection algorithms do not consider differential environmental conditions that exist between an access point and each receiver and further fail to consider different transmit power levels. Open-loop channel selection algorithms also fail to consider frequency-specific noise local to the clients.

Implementation-specific problems also exist with respect to sampling frequency in current open-loop automatic channel selection algorithms. For example, automatic channel selection may occur only at startup. A particular instance of interference may not exist during startup of a particular communication system and, instead, arise during a communication session. In this instance, an open-loop automatic-channel selection algorithm would fail to invoke an appropriate channel adjustment.

Interference, noise, and component frequency response are asymmetric and differentially affect radio transmitters and receivers. As such, optimizing radio system performance requires selecting an optimal channel that takes all of these effects into account. There is a need in the art for an automatic-channel selection solution that takes into account these effects at any time during a communication session.

SUMMARY OF THE INVENTION

In an exemplary embodiment of the presently claimed invention, a method for optimizing radio performance in a network is provided. Through this method, actual maximum user throughput between a measuring station and another station in the network is measured. The measurement is associated with channel quality of a present transmission channel. The method also includes test traffic data being sent from the measuring station to the other station. The measurement of this test traffic data is associated with channel quality of an available transmission channel. The measured data as it pertains to actual maximum user throughput and the test traffic data is then stored for subsequent analysis. As a result of that analysis, a determination is made with respect to channel quality between the measuring station and the other station in the network. The measuring station maintains the present transmission channel if the channel quality is the same as or greater than the channel quality of the available channel between the measuring station and the other station. If the transmission quality is less than that of another channel, the access point makes a change to that transmission channel with respect to future data exchanges.

A further embodiment of the presently claimed invention provides for a computer-readable storage medium. A program is embodied on the medium and is executable by a processor. Execution of the program by the processor allows for the performance of a method for optimizing radio performance in a network. Through this method, actual maximum user throughput between a measuring station and another station in the network is measured. The measurement is associated with channel quality of a present transmission channel. The measurement occurs during normal network traffic patterns. The method also includes test traffic data being sent from the measuring station to the other station. The measurement of this test traffic data is associated with channel quality of an available transmission channel. The measurement occurs during idle periods. The measured data as it pertains to actual maximum user throughput and the test traffic data is then stored for subsequent analysis. As a result of that analysis, a determination is made with respect to channel quality between the measuring station and the other station in the network. The measuring station maintains the present transmission channel if the channel quality is the same as or greater than the channel quality of the available channel between the measuring station and the other station. If the transmission quality is less than that of another channel, the access point makes a change to that transmission channel with respect to future data exchanges. In the event of a transmission channel change, a dynamic frequency selection mechanism is utilized.

A still further embodiment of the presently claimed invention provides for a system for optimizing radio performance. The system includes a measurement engine configured to record maximum user throughput on a per station basis during normal traffic operation. The measurement engine is further configured to record throughput metrics based on test traffic sent to all associated stations during idle operation. The system also includes a performance database configured to record and preserve per-channel throughput data. The data may be preserved across channel changes and chip resets. The system also includes a logic and policy engine configured to determine when to measure throughput, the logic and policy engine further configured to determine which channel on which throughput is measured.

DETAILED DESCRIPTION

Embodiments of the present invention provide for selection of a transmission channel so that interference may be minimized in a wireless link to a remote receiving node. The presently described system (as may be embodied in, for example, an access point) may select a transmission channel that minimizes interference from other radio transmitting devices or disturbances in the wireless link between the system and the remote receiving device. The system may further select a corresponding antenna configuration to allow for maximum gain between the system and the remote receiving device. Alternatively, the system may select a transmission channel and/or antenna configuration corresponding to less than maximum gain but providing for reduced interference in the wireless link.

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable storage medium represent examples of programming means for executing the steps of the methods and/or implementing particular system configurations disclosed herein.

Figure 1:
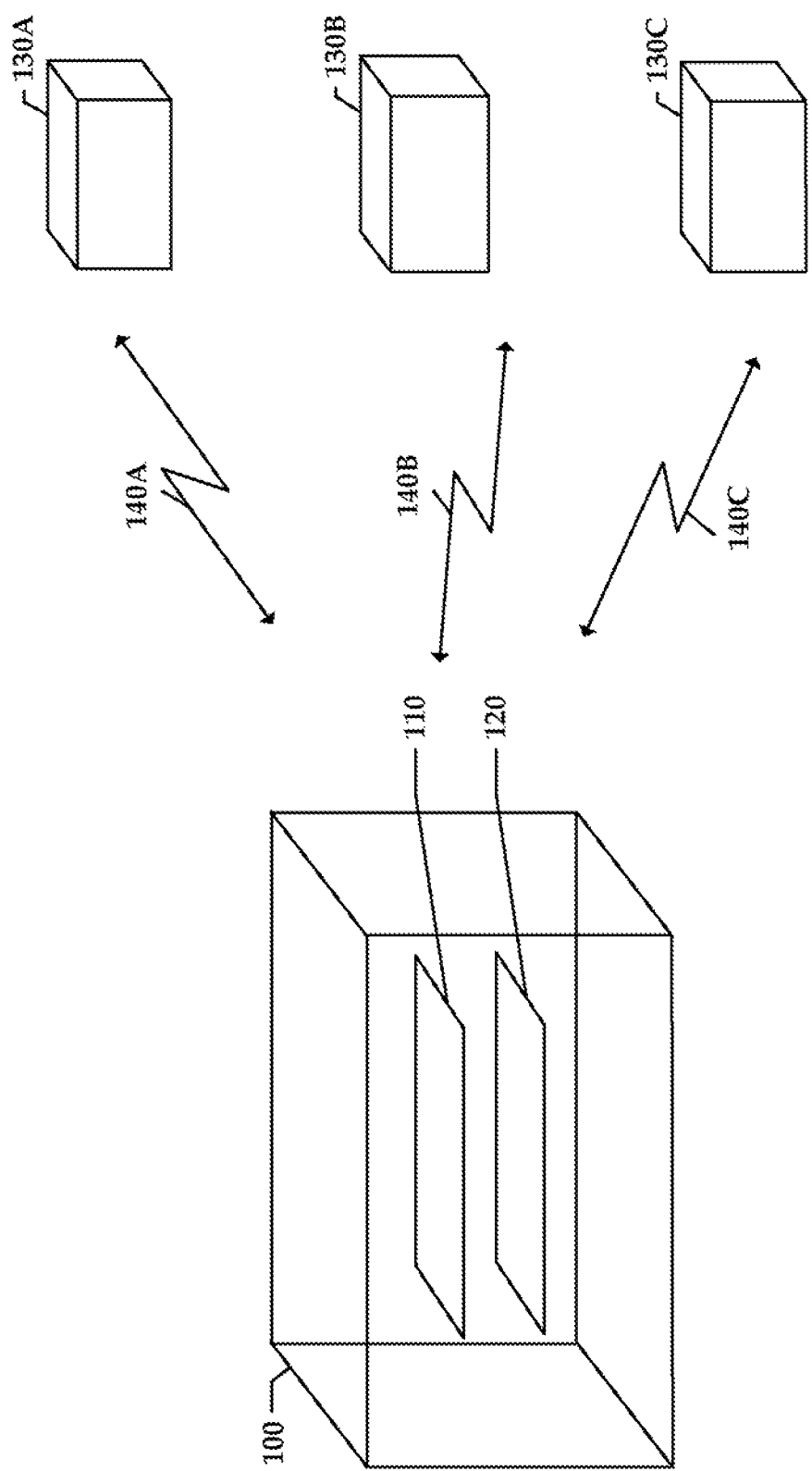
FIG. 1 illustrates a system including an antenna apparatus with selectable elements.

FIG. 1 illustrates a transmitter and/or receiver system 100 including an antenna apparatus with selectable elements. For ease of reference, transmitter and/or receiver system 100 will hereinafter be referred to as transceiver system 100. The transceiver system 100 illustrated in FIG. 1 may be representative of an 802.11 access point, an 802.11 receiver, a set-top box, a laptop computer, an Internet Protocol television (IPTV), a Personal Computer Memory Card International Association (PCMCIA) card, or a remote computing terminal such as a handheld gaming device. Transceiver system 100 may communicate with one or more remote receiving nodes over a wireless link, for example, in an 802.11 wireless network. The transceiver system 100 may receive data from a router connected to the Internet (not shown). The transceiver system 100 may transmit the data to one or more remote receiving nodes (e.g., receiving nodes 130A-130C). Transceiver system 100 may also form a part of a WLAN by enabling communications among two or more of the remote receiving nodes 130A-130C (e.g., as an intermediate node or proxy). Although the transceiver system 100 of FIG. 1 is described as the access point for an 802.11 wireless network, transceiver system 100 may also include the remote receiving node 130A.

Transceiver system 100 as referenced in FIG. 1 includes a communication device 120 and an antenna apparatus 110. Communication device 120 is inclusive of any device for converting data at a physical data rate and for generating and/or receiving a corresponding radio frequency (RF) signal. Communication device 120 may include a radio modulator/demodulator for converting data received by the transceiver system 100 (e.g., data received from a router) into the RF signal for transmission to one or more of the remote receiving nodes 130A-130C. The communication device 120 may include circuitry for receiving data packets from the router and circuitry for converting the data packets into 802.11 compliant RF signals.

The antenna apparatus 110 includes individually selectable antenna elements (not shown). When selected, each of the antenna elements produces a directional radiation pattern with gain as compared to an omnidirectional antenna. As further described in the context of FIG. 3, antenna apparatus 110 includes an antenna element selector device 310 to selectively couple one or more of the antenna elements to the communication device 120. Examples of antenna apparatus 110 and antenna element selector device 310 are further described in U.S. patent publication number 2006-0038734 for a "System and Method for an Omnidirectional Planar Antenna Apparatus with Selectable Elements"; U.S. patent publication number 2006-0038735 for a "System and Method for a Minimized Antenna Apparatus with Selectable Elements"; and U.S. Pat. No. 7,193,562 for a "Circuit Board Having a Peripheral Antenna Apparatus with Selectable Antenna Elements." The disclosure of each of the aforementioned applications and patent has previously been incorporated by reference.

Figure 2:
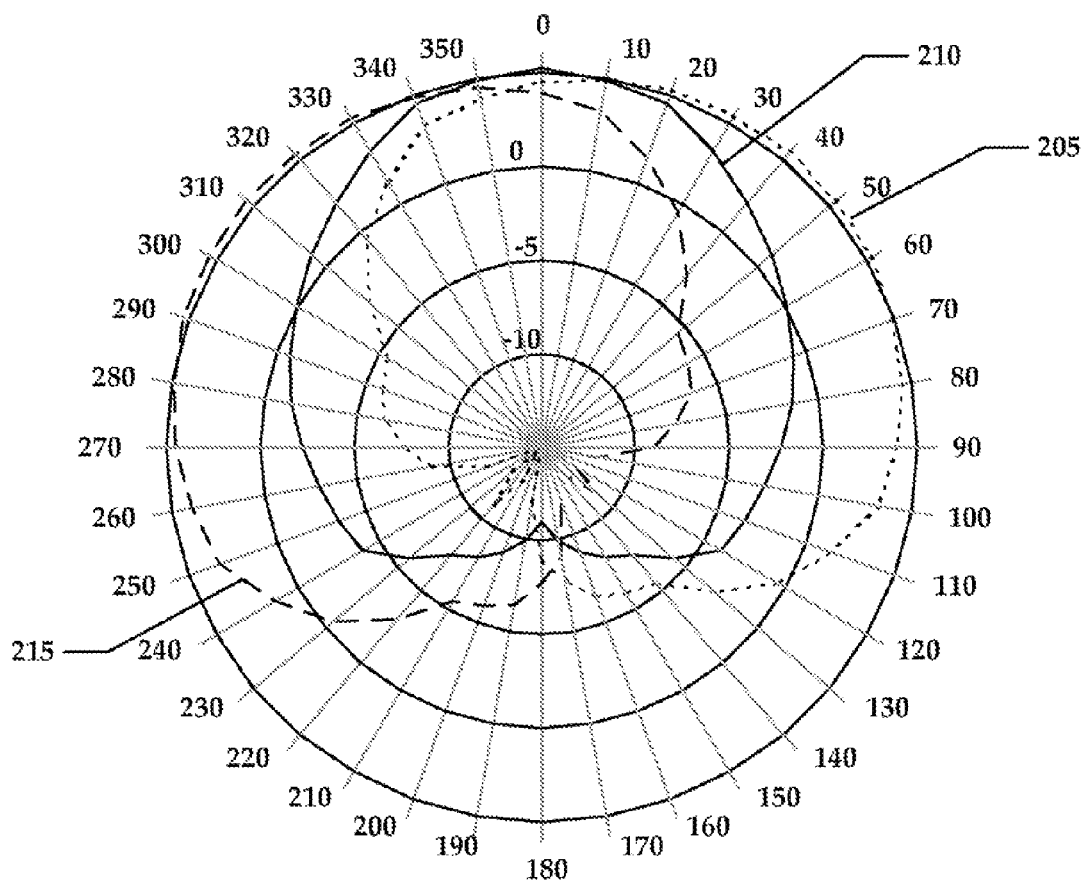
FIG. 2 illustrates various radiation patterns resulting from selecting different antenna configurations of the antenna apparatus of FIG. 1.

FIG. 2 illustrates various radiation patterns resulting from selecting different antenna elements of the antenna apparatus 110 of FIG. 1. Antenna apparatus 110 used to produce the exemplary radiation pattern of FIG. 2 includes four selectable antenna elements {A|B|C|D}. The antenna elements (referred to as antenna elements A-D) used to produce the radiation pattern of FIG. 2 are offset from each other by 90 degrees. Each antenna element produces a similar radiation pattern offset from the other radiation patterns. For example, the radiation pattern of antenna element A is offset by 90 degrees from the radiation pattern of antenna element B. Accordingly, selecting one or more of the antenna elements A-D produces 15 different radiation patterns. For clarity of discussion, only three radiation patterns are shown in FIG. 2.

A first radiation pattern 215, depicted as a dashed line, is produced by selecting the antenna element A. The radiation pattern is a generally cardioid pattern oriented with a center at about 315 degrees in azimuth. A second radiation pattern 205, depicted as a dotted line, is produced by selecting the antenna element B. The antenna element B is offset 90 degrees from antenna element A. The radiation pattern 205 is therefore oriented with a center at about 45 degrees in azimuth. A combined radiation pattern 210, depicted as a bold solid line, results from selecting the antenna element A and the antenna element B. By selecting two or more of antenna elements A-D, a substantially omnidirectional radiation pattern may be produced. Antenna apparatus 110 may produce a range of radiation patterns, ranging from highly directional to omnidirectional.

Figure 3:
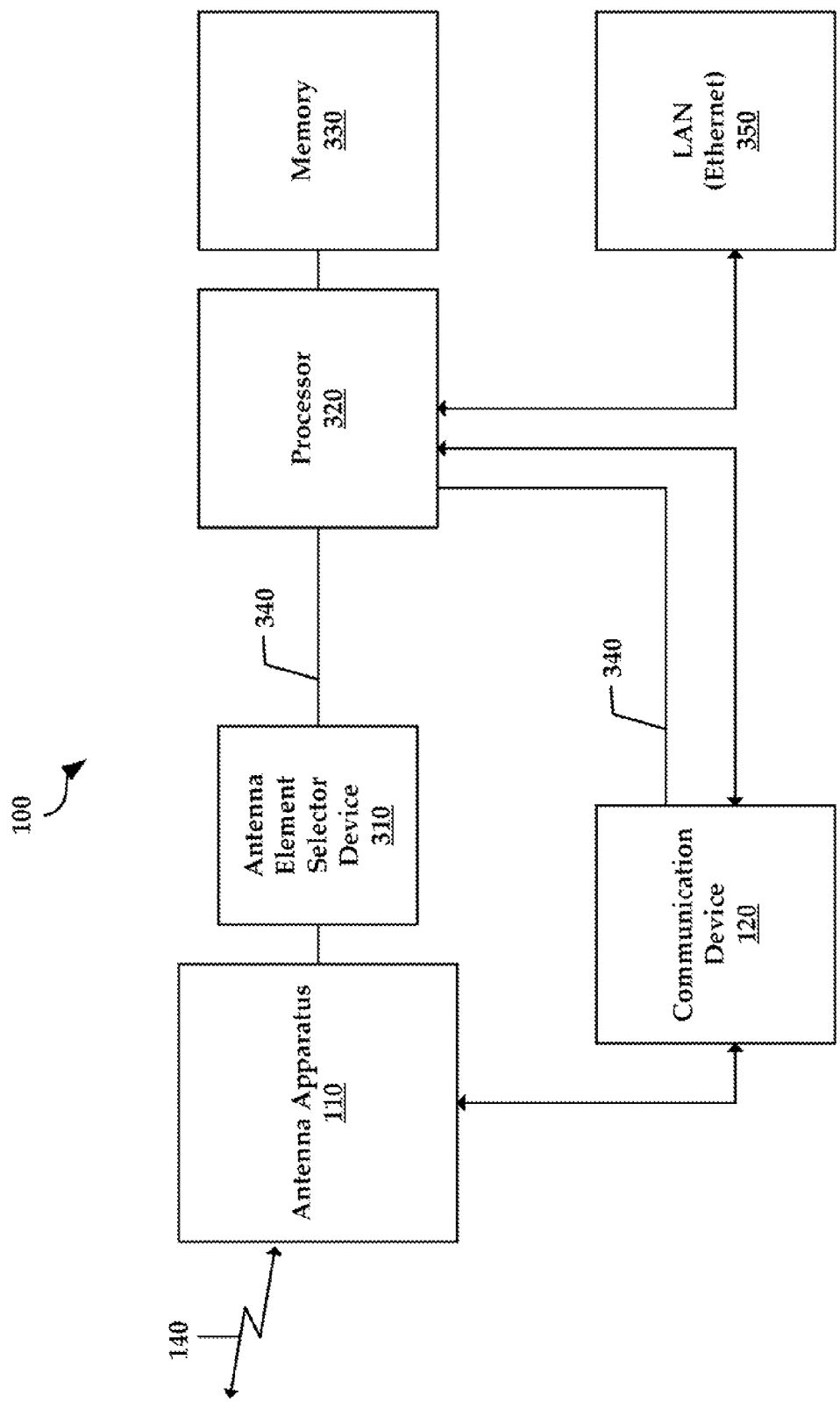
FIG. 3 illustrates an exemplary block diagram of the system of FIG. 1.

FIG. 3 illustrates an exemplary block diagram of the transceiver system 100 of FIG. 1. Transceiver system 100 as illustrated in FIG. 1 includes a processor 320 coupled to a memory 330. Processor 320 may include a microcontroller, a microprocessor, or an application-specific integrated circuit (ASIC). Processor 320 executes a program stored in the memory 330. Memory 330 may also stores transmission channel data, which may be retrieved by the processor 320 to control selection of a transmission channel. Memory 330 may store other information including data related to an optimal antenna configuration of the antenna apparatus 110 as well as information related to selection of a physical data rate of the communication device 120.

In FIG. 3, processor 320 is coupled to the antenna element selector device 310 by a control bus 340. The antenna element selector device 310 of FIG. 3 is coupled to the antenna apparatus 110 to allow selection from among the multiple radiation patterns described in FIG. 2. The processor 320 controls the antenna element selector device 310 to select an antenna configuration for antenna apparatus 110 and its resulting radiation pattern(s).

The processor 320 of FIG. 3 is further coupled to the communication device 120 by the control bus 340. The processor 320 controls the communication device 120 to select a physical data rate (i.e., one of the multiple physical data rates). The processor 320 controls the physical data rate at which the communication device 120 converts data bits into RF signals for transmission via the antenna apparatus 110.

In some embodiments, the processor 320 may receive packet data, Transmission Control Protocol (TCP) packet data, or User Datagram Protocol (UDP) packet data from LAN 350. The processor 320 converts the TCP or UDP packet data into an 802.11 wireless protocol. The processor 320 selects an antenna configuration of the antenna apparatus 110 and sends the 802.11 wireless protocol to the communication device 120 for conversion at the physical data rate into RF for transmission via the antenna apparatus 110 to the remote receiving node (e.g., the remote receiving node 130A) over the wireless link (e.g., the wireless link 140A).

Processor 320 also controls selection of a transmission channel for the communication device 120 with respect to minimizing interference. Embodiments of the present invention may utilize a closed-loop approach, which allows for direct measurement of a metric such as throughput. The metric is then used as the basis for transmission channel optimization decisions. A closed-loop approach may also take into account channel environmental conditions, interference, and power levels. Closed-loop channel selection schemes may transmit a pilot signal to a remote access point. The remote access point may then determine the magnitude and/or phase of the channels from each pilot signal, find optimal weight values based on the magnitude and/or phase of the channels and sends these values back to the base station. The base station may then use these weight values to adapt the transmission of data channels.

Figure 4:
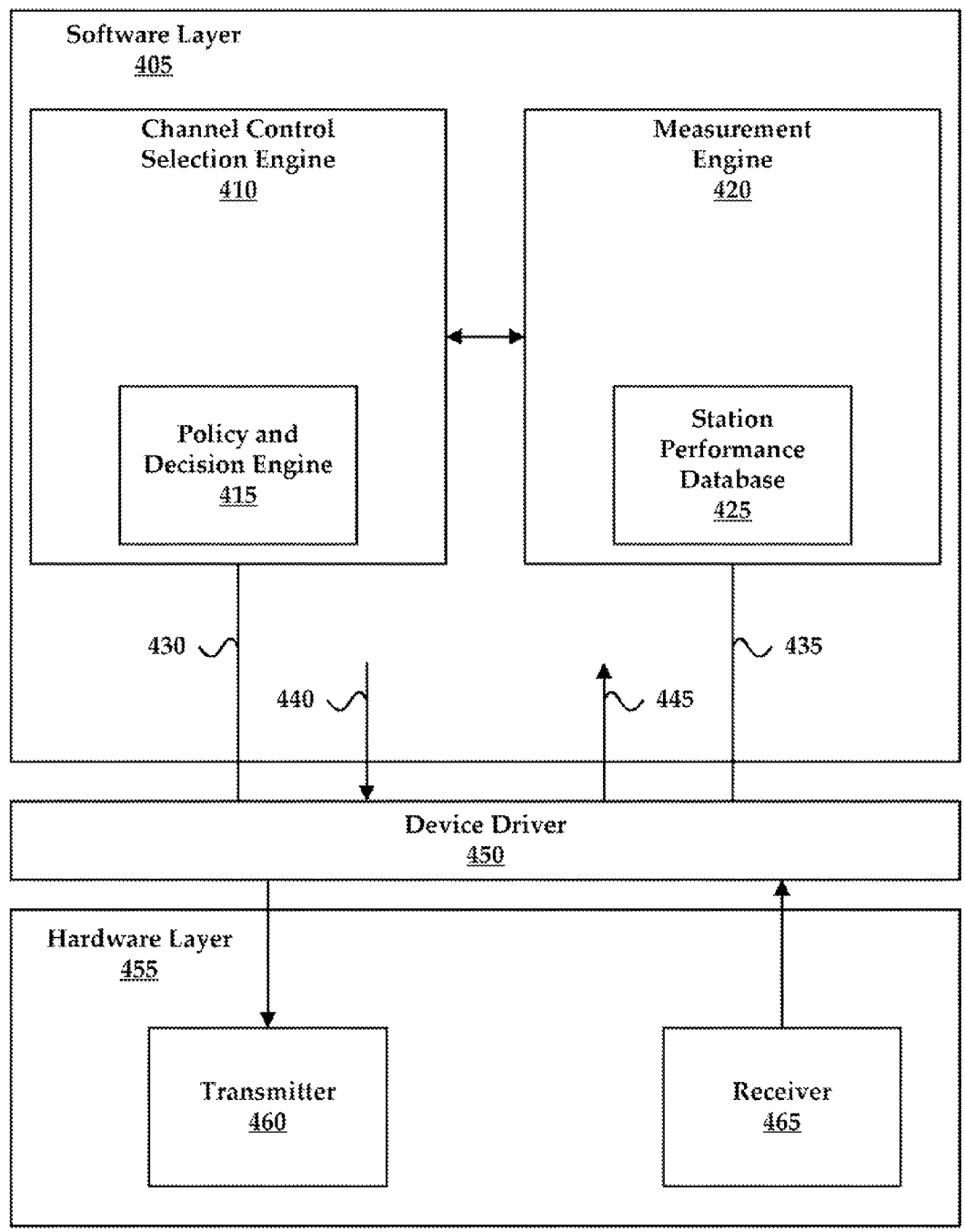
FIG. 4 illustrates a block diagram of an exemplary software layer, device driver, and a hardware layer of the system illustrated in FIGS. 1 and 3.

FIG. 4 illustrates a block diagram of an exemplary software layer 405, a device driver 450, and a hardware layer 455. The software layer 405 and the device driver 450 include instructions executed by the processor 320 of FIG. 3. The hardware layer 455 includes hardware elements of the transceiver system 100 described with respect to FIG. 3, such as the antenna selector device 310 and the communication device 120. Although described as software and hardware elements, various aspects of the present invention may be implemented in combinations of software, hardware, and firmware.

The software layer 405 includes a channel control selection engine 410 and a measurement engine 420. The channel control selection engine 410 includes a policy and decision engine 415. The policy and decision engine 415 encapsulates policy and decision making including when to measure and when to change a channel. The measurement engine 420 includes a station performance database 425. The hardware layer 455 includes a transmitter 460 and a receiver 465.

The channel control selection engine 410 is linked to the measurement engine 420. The channel control selection engine 410 communicates with the device driver 450 via link 430. The measurement engine 420 communicates with the device driver 450 via link 435. The device driver 450 receives packets via link 440 from the software layer 405 and sends the packets to the transmitter 460 in the hardware layer 455. The device driver 450 also receives packets from the receiver 465 in the hardware layer 455 and sends the packets to the software layer 405 via link 445.

The channel control selection engine 410 includes software elements configured to select a transmission channel for the device driver 450. Channel control selection engine 410 may operate in conjunction with other engines or modules. For example, an embodiment of the present invention may further include a transmission control selection engine for selecting a desirable antenna configuration to further aid in minimizing wireless network interference. This engine may be similar to that disclosed in U.S. patent publication number 2006-0040707 for a "System and Method for Transmission Parameter Control for an Antenna Apparatus with Selectable Elements," the disclosure of which has been previously incorporated herein by reference.

Selection of a particular transmission channel may be based on analysis and feedback received at measurement engine 420 or based on (or in conjunction with) decisions rendered by the policy and decision engine 415. The measurement engine 420 includes software elements configured to update transmission channel quality metrics for each transmission channel based on data initially received at the device driver 450. The measurement engine 420 is configured to maintain the transmission channel quality metrics in the station performance database 425. The station performance database 425 records and preserves per-channel throughput data across channel changes and chip resets. The database 425 may also preserve data across a system reboot.

An advantage of the transceiver system 100 is that the channel control selection engine 410 may select, for example, a transmission channel that minimizes interference for communicating over the wireless link 140A to the remote receiving node 130A based on feedback (i.e., direct or indirect) from the receiving node utilizing an aforementioned closed-channel approach. Particular antenna configuration selections for the antenna apparatus 110 may also aid in this regard.

The device driver 450 may indicate whether the remote receiving node received transmitted packets on a particular antenna configuration and transmission channel and metric quality related to the same. The transmission control selection engine 410 may also select another transmission channel for communicating over the wireless link 140B to the remote receiving node 130B based on the feedback. By selecting an optimal transmission channel and, if necessary, an optimal antenna configuration, the radiation pattern and transmission channel of the transceiver system 100 may minimize interference in the wireless link 140A and/or the wireless link 140B.

Information provided by the channel control selection engine 410 may be used to help select an appropriate antenna configuration corresponding to a maximum gain for the wireless links 140A-140C. Alternatively, information generated by the channel control selection engine 410 may be used to select the antenna configuration corresponding to less than maximal gain but corresponding to reduced interference in the wireless links 140A-140C.

Figure 5:
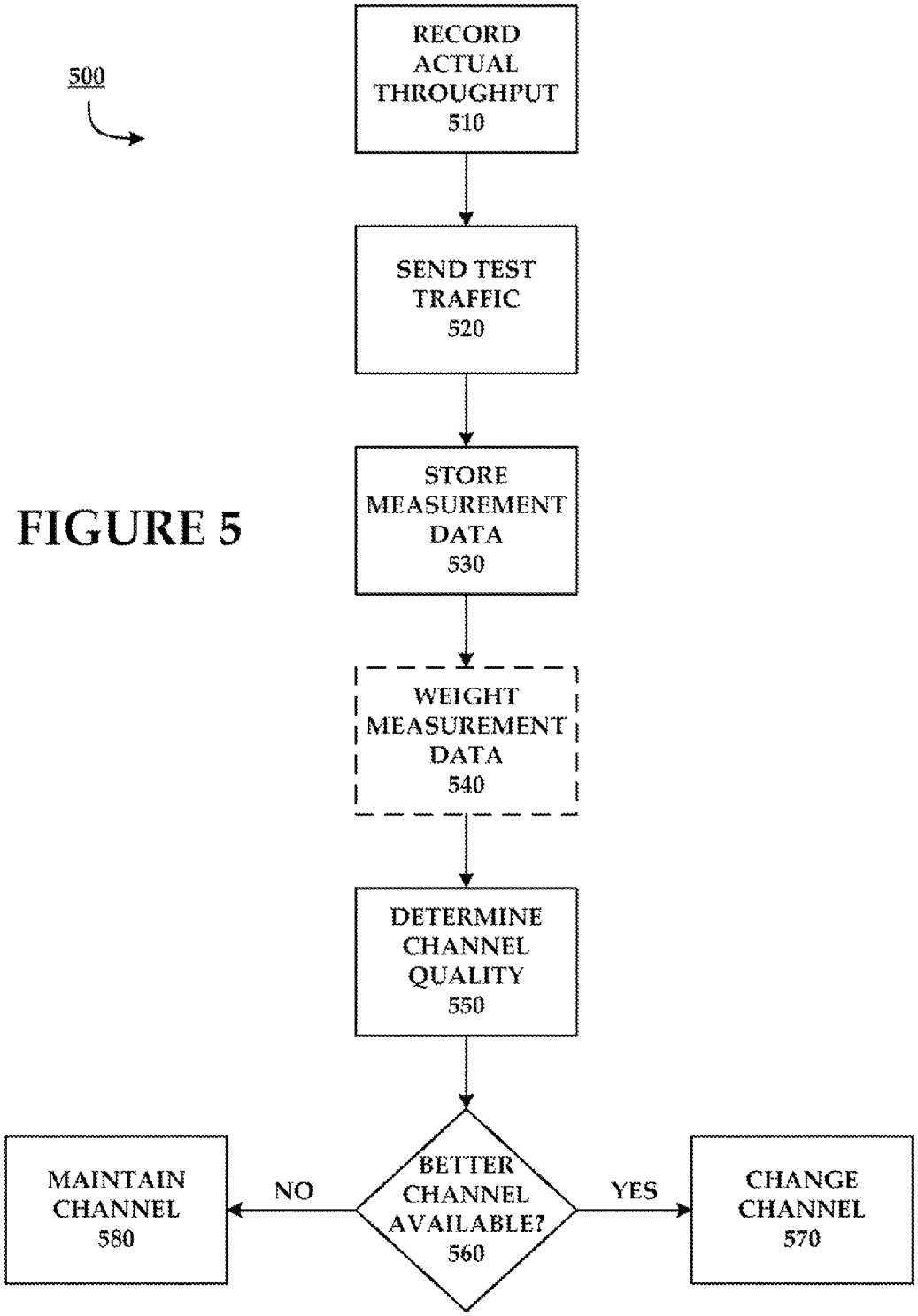
FIG. 5 illustrates an exemplary method for automatic channel selection as may be executed by the system of FIGS. 1 and 3.

FIG. 5 illustrates an exemplary method 500 for automatic channel selection. The steps identified in FIG. 5 (and the order thereof) are exemplary and may include various alternatives, equivalents, or derivations thereof including but not limited to the order of execution of the same. The steps of the process of FIG. 5 (and its various alternatives) may be embodied in hardware or software including a machine-readable storage medium (e.g., optical disc, memory card, or hard drive) including instructions executable by the processor of a computing device.

In step 510, the measurement engine 420 of transceiver system 100 records actual maximum user throughput on a per station basis. These measurements may occur during normal network traffic patterns. The measurements may be associated with a current transmission channel. In step 520, the measurement engine 420 of transceiver system 100 sends test traffic to those stations that were measured in step 510. Throughput measurements of the test traffic data taken during step 520 may occur during idle periods. Measurements taken in step 520 may utilize modeling or other throughput estimation techniques known in the art due to the presently idle nature of the particular channel. The measurement operations of step 520 pertain to other available transmission channels.

Measurements may be scheduled by the policy and decision engine 415 of transceiver system 100. For example, measurements may be taken only when wireless link utilization is below a particular threshold. That threshold may be the sum of the uplink and downlink. Measurements may also be taken where there is no traffic of a particular classification or importance (e.g., non-video or non-voice traffic) present on the network. The presence of important traffic may be determined 'in the now' (i.e., is there important traffic immediately present on the link) or following a predefined number of seconds. Measurements taken in steps 510 and 520 may be stored at step 530 in the station performance database 425 of system 100.

In optional step 540, measurement data as acquired in steps 510 and 520 may be weighted in order to assign a greater overall value to more recent data. The weighted data may be stored in performance database 425 in place of or in addition to that data initially measured in steps 510 and 520. Weightings may be applied by the measurement engine 420 with respect to identifying when the particular measurement data was acquired.

The quality of the present and other available transmission channels is determined in step 550. In order to determine the quality of channels other than the present channel, transceiver system 100 may utilize channel probing. Channel probing may further involve gratuitous channel changing in order to gather data. In this regard, measurements taken during step 520 may occur concurrently with certain measurements taken in step 510 or serially, before or after the same. Channel quality may include weighted measurement data, non-weighted measurement data, or a combination of the two.

In step 560, a determination is made by policy and decision engine 415 as to whether an available channel is better than a present channel. If the quality of one another channel is better than the present channel, then a channel change occurs in step 570. If the quality of another channel is the same or less than the present channel, then a channel change does not occur in step 580.

The quality of a channel may be determined as that channel which maximizes the sum of all throughputs to all recently measured stations. A minimum per station performance target may also be used. Advanced criteria may include assigning a differential weight to different types of clients. This may include video clients and voice clients. Channel changing as occurs in step 570 may occur through the use of an 802.11h Dynamic Frequency Selection (DFS) mechanism to quickly change channels.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems.

What is claimed is:

1. A method for optimizing radio performance in a network, the method comprising:

measuring actual maximum user throughput over a present 802.11 compliant transmission channel between a measuring station and another station in the network, the measurement of actual maximum user throughput associated with a closed loop between the measuring station and the other station and a channel quality of a present transmission channel, wherein measuring actual maximum user throughput occurs during normal network traffic patterns;

measuring test traffic data sent from the measuring station to the other station over an available 802.11 compliant transmission channel between the measuring station and the other station, the measurement associated with the closed loop between the measuring station and the other station and the channel quality of the available transmission 802.11 compliant channel;

storing measurement data associated with the actual maximum user throughput and the test traffic data, wherein the measurement data is closed-loop measurement data; and determining channel quality between the measuring station and the other station in the network, wherein the measuring station maintains the present 802.11 compliant transmission channel when the channel quality of the present 802.11 compliant transmission channel is the same as or greater than the channel quality of the available 802.11 compliant channel between the measuring station and the other station.

2. The method of claim 1, wherein measuring the test traffic data occurs during idle periods.

3. The method of claim 2, wherein measurement of the test traffic data includes the use of a throughput estimation technique.

4. The method of claim 2, wherein measurement of the test traffic data includes the user of a model.

5. The method of claim 1, wherein measurement of the actual maximum user throughput or the test traffic data occurs according to a schedule.

6. The method of claim 1, wherein measurement of the actual maximum user throughput or the test traffic data occurs when wireless link utilization between the measuring station and the other station falls below a particular threshold.

7. The method of claim 1, wherein measurement of the actual maximum user throughput or the test traffic data occurs when there is no data of a particular classification being exchanged between the measuring station and the other station.

8. The method of claim 7, wherein there is no data of the particular classification being exchanged at the time the measurement is to take place.

9. The method of claim 7, wherein there is no data of the particular classification being exchanged for a predetermined period of time.

10. The method of claim 1, further comprising weighting the stored measurement data.

11. The method of claim 10, wherein the stored measurement data is replaced by the weighted measurement data.

12. The method of claim 11, wherein determining channel quality is based on the stored weighted measurement data.

13. The method of claim 10, wherein the stored measurement data is stored in conjunction with the weighted measurement data.

14. The method of claim 13, wherein determining channel quality is based on the stored measurement data and the stored weighted measurement data.

15. The method of claim 1, wherein determining channel quality is based on the stored measurement data.

16. The method of claim 1, wherein the measuring station changes the present transmission channel to the available transmission channel if the channel quality of the present transmission channel is less than the channel quality of the available channel.

17. The method of claim 16, wherein the transmission channel is changed utilizing a dynamic frequency selection mechanism.

18. A non-transitory computer-readable storage medium having embodied thereon a program, the program being executable by a processor to perform a method for optimizing radio performance in a network, the method comprising:

measuring actual maximum user throughput between a measuring station and another station in the network over a present 802.11 compliant transmission channel, the measurement associated with channel quality of a present 802.11 compliant transmission channel, wherein measuring actual maximum user throughput occurs during normal network traffic patterns, wherein measuring actual maximum user throughput occurs during normal network traffic patterns;

measuring test traffic data sent from the measuring station to the other station over an available 802.11 compliant transmission channel, the measurement associated with a closed loop between the measuring station and the other station and channel quality of an available 802.11 compliant transmission channel, wherein measuring the test traffic data occurs during idle periods;

storing measurement data associated with the actual maximum user throughput and the test traffic data, wherein the measurement data is closed-loop measurement data; and determining channel quality between the measuring station and the other station in the network, wherein the measuring station maintains the present 802.11 compliant transmission channel when the channel quality is the same as or greater than the channel quality of the available 802.11 compliant channel between the measuring station and the other station and the measuring station changes the present 802.11 compliant transmission channel to the available 802.11 compliant transmission channel when the channel quality of the present 802.11 compliant transmission channel is less than the channel quality of the available 802.11 compliant channel, wherein the transmission 802.11 compliant channel is changed utilizing a dynamic frequency selection mechanism.

19. A system for optimizing radio performance, the system comprising:

a measurement engine stored in memory and executable by a processor to:
record maximum user throughput on a per station basis during normal traffic operation over present 802.11 compliant transmission channels, and
record throughput metrics based on test traffic sent to all associated stations during idle operation over one or more available 802.11 compliant transmission channels;

a performance database that preserves per-channel throughput data across 802.11 compliant channel changes and chip resets in memory; and a policy and decision engine stored in memory and executable by a processor to:
determine when to measure throughput, and
determine on which 802.11 compliant channel throughput is measured, wherein the measurement is a closed-loop measurement between a measuring station and a second station.

* * * * *